(12) United States Patent
Wang

(10) Patent No.: US 7,242,999 B2
(45) Date of Patent: Jul. 10, 2007

(54) METHOD AND APPARATUS FOR IDENTIFYING VIRTUAL BODY PROFILES

(76) Inventor: Kenneth Kuk-Kei Wang, House 6, Greene Villa, Lot 251 DD 223, 7-1/2M Clearwater Bay Road-Sal Kung, Kowloon (HK)

( * ) Notice: Subject to any disclaimer, the term of this patent is extended or adjusted under 35 U.S.C. 154(b) by 25 days.

(21) Appl. No.: 11/296,447

(22) Filed: Dec. 8, 2005

(65) Prior Publication Data
US 2007/0032898 A1    Feb. 8, 2007

Related U.S. Application Data

(63) Continuation-in-part of application No. 10/477,323, filed as application No. PCT/EP01/05480 on May 11, 2001, now abandoned.

(51) Int. Cl.
*G06F 19/00* (2006.01)
(52) U.S. Cl. .................. 700/132; 700/130; 700/131
(58) Field of Classification Search ............... 700/130, 700/131, 132, 138; 702/155, 156, 157, 158, 702/159; 705/26; 707/1, 3, 7, 103 R, 102; 345/418, 419, 420
See application file for complete search history.

(56) References Cited

U.S. PATENT DOCUMENTS

| | | | | |
|---|---|---|---|---|
| 4,885,844 A * | 12/1989 | Chun | ............... | 33/15 |
| 5,515,268 A * | 5/1996 | Yoda | ............... | 705/26 |
| 5,530,652 A * | 6/1996 | Croyle et al. | ............... | 700/130 |
| 5,930,769 A * | 7/1999 | Rose | ............... | 705/27 |
| 5,956,525 A * | 9/1999 | Minsky | ............... | 396/3 |
| 6,101,424 A * | 8/2000 | Sawada | ............... | 700/136 |
| 6,438,853 B1 * | 8/2002 | Gordon et al. | ............... | 33/2 R |
| 6,516,240 B2 * | 2/2003 | Ramsey et al. | ............... | 700/131 |
| 6,546,309 B1 * | 4/2003 | Gazzuolo | ............... | 700/132 |
| 6,564,118 B1 * | 5/2003 | Swab | ............... | 700/131 |
| 6,665,577 B2 * | 12/2003 | Onyshkevych et al. | ............... | 700/130 |
| 6,701,207 B1 * | 3/2004 | Gazzuolo | ............... | 700/132 |
| 6,711,455 B1 * | 3/2004 | Holloway et al. | ............... | 700/132 |
| 6,968,075 B1 * | 11/2005 | Chang | ............... | 382/111 |
| 7,092,782 B2 * | 8/2006 | Lee | ............... | 700/132 |

(Continued)

FOREIGN PATENT DOCUMENTS

EP    838167 A1 *    4/1998

(Continued)

*Primary Examiner*—Gary L. Welch
*Assistant Examiner*—Nathan Durham
(74) *Attorney, Agent, or Firm*—William H. Holt

(57) ABSTRACT

3D morphological data representative of reference size models of garment brands and respective categorizing data are introduced into an information processing system. These 3D morphological data are indexed by brand names, categorizing data, and volumetric, dimensional, and angular data derived from the morphological data in order to build a database of virtual human body profiles. For selecting a suitable profile matching a consumer's body, his/her personal measurements and categorizing data are introduced into the system, either directly if they are known, or acquired by scanning only a minimum numbers of points on the customer's body in a scanning booth so as to derive these measurements. Instead of methods of the prior art defining the body profiles of the consumers per se from the general population, this method attempts to categorize the body profiles of the specific brands' reference size human models, and all offered sizes, through the brands' grading rules.

27 Claims, 2 Drawing Sheets

U.S. PATENT DOCUMENTS

| | | | |
|---|---|---|---|
| 7,149,665 B2 * | 12/2006 | Feld et al. | 703/2 |
| 2001/0026272 A1 * | 10/2001 | Feld et al. | 345/419 |
| 2002/0077922 A1 * | 6/2002 | Srinivasan | 705/26 |
| 2002/0138170 A1 * | 9/2002 | Onyshkevych et al. | 700/130 |
| 2002/0188372 A1 * | 12/2002 | Lane et al. | 700/130 |
| 2004/0083142 A1 * | 4/2004 | Kozzinn | 705/27 |

FOREIGN PATENT DOCUMENTS

| | | |
|---|---|---|
| JP | 11304470 A * | 11/1999 |
| WO | WO 200101235 A1 * | 1/2001 |

* cited by examiner

| UBPIS-KEY | Brand | Category | Body Type | Size | Version |
|---|---|---|---|---|---|
| BDA -MCBY003 - 0504 | Brand A | Male-child | Boy | 3 | 0504 |
| BDA - MCBY004 - 0505 | Brand A | Male-child | Boy | 4 | 0505 |
| ... | ... | ... | ... | ... | ... |
| BDA -FMJR006 - 0407 | Brand A | Female | Junior | 6 | 0407 |
| BDA - FMJR007 - 0505 | Brand A | Female | Junior | 7 | 0505 |
| ... | ... | ... | ... | ... | ... |
| BDA -FMMS009 - 0412 | Brand A | Female | Missy | 9 | 0412 |
| BDA -FMMS012 - 0501 | Brand A | Female | Missy | 12 | 0501 |
| ... | ... | ... | ... | ... | ... |
| BDA -MAMN010 - 0508 | Brand A | Male-adult | Men | 10 | 0508 |
| ... | ... | ... | ... | ... | ... |

FIG. 2

| UBPIS-KEY | Neck Girth | Chest Girth | Waist Girth | Waist Height | Hip Girth | Inseam Height | Body Height | Full Arm Length |
|---|---|---|---|---|---|---|---|---|
|  |  |  |  |  |  |  |  |  |
|  |  |  |  |  |  |  |  |  |
|  |  |  |  |  |  |  |  |  |
|  |  |  |  |  |  |  |  |  |

FIG. 3

| UBPIS-KEY | Center front torso angle [at CF-Neck] | Center back torso angle [at CB-Neck] | Center front waist torso angle | Center back waist torso angle |
|---|---|---|---|---|
|  |  |  |  |  |
|  |  |  |  |  |
|  |  |  |  |  |
|  |  |  |  |  |

FIG. 4

METHOD AND APPARATUS FOR IDENTIFYING VIRTUAL BODY PROFILES

RELATED APPLICATION

This application claims priority, as a continuation-in-part application, of the application entitled "Universal Method for Identifying Human Body Profiles", filed on May 11, 2001 as Application PCT/EP01/05480, and U.S. National Phase identified by Ser. No. 10/477,323 now abandoned, the content of which is hereby incorporated by reference in its entirety.

BACKGROUND

1. Field of the Invention

The present invention relates to a method and an apparatus for identifying virtual body profiles representing real human bodies.

2. Description of Related Art

In a number of fields there is a need to obtain three-dimensional digital data which may subsequently be used in particular to develop a virtual and/or real dummy body which is highly representative of the body of a subject under consideration.

The virtual dummy body can subsequently be used in connection with CAD systems (computer aided design/drawing).

As for the actual dummy body this may subsequently be used for the production, testing and checking of actual size prototypes.

The use of dummy bodies of this kind takes on a particular importance in the field of clothing design but also in all other fields which require a faithful representation of the body of the subject under consideration in all its diversity.

For example, International Patent Application WO 01/01235 published on 4 Jan. 2001 in the name of T. Singhal illustrates the use of digital models to make it easier to purchase a garment. A virtual image of the customer wearing the garment of their choice is generated by a computer from measurements supplied by the customer.

Another way of obtaining digital data representing a person is to acquire images of this person and digitize them.

Croyle, U.S. Pat. No. 5,530,652, describes a process of this kind and the system based on a video camera which is adapted to carry it out. The process in question allows the morphological data of a target population to be entered into a database and to be organized according to volumetric, dimensional and angular criteria. This database makes it possible to produce standard patterns for different categories of garments.

Sawada, U.S. Pat. No. 6,101,424 also describes a method of making clothes by recording and categorizing live models. A virtual dummy which is as close as possible to the person who is to wear the garment is developed from the data recorded and from measurements resulting from the digitization of the body of this person.

Up till now, the development of three-dimensional digital data representing the body of a subject under consideration required a "heavy" phase of digitizing the body of this subject, allowing a very large number of points (typically several thousand) to be recorded.

For example, according to Sawada's method, the customer is measured in three dimensions, both in nude and in foundation garment, at an underwear sales corner in a department store. The preferred non-contact three-dimensional measuring machine which measures the customer's body is a system called "body line scanner", or "BL scanner", described in "Automation Technology" (in Japanese), Vol. 26, No. 10, pp 56–62.

The "BL scanner" is also described in Japanese Pat. Appl. JP1121707, as well as in numerous brochures and papers from the HAMAMATSU PHOTONICS company.

It features 2,048,000 measurement points at high precision scanning or 1,024,000 measurement points at high speed scanning.

The above specifications of the "BL scanner" make clear that Sawada's method involves the use of sophisticated and expensive equipment, and takes some time.

A much simpler system allowing an individual to order a customized pattern of a garment at an affordable cost is described by Swab in U.S. Pat. No. 6,564,118. The system features an apparel design database comprising a multiplicity of individual garment design profiles. Profiles are selected according to customer's body measurements which are entered by an input device such as a keyboard, a mouse, a voice recognition unit or an automatic body shape scanner, or any combination of these devices. Only one thousand points may be scanned by an optical shape sensor such as the one described in U.S. Pat. No. 5,515,268. These data are transmitted to a remote computer in order to enable this remote computer to perform fit evaluation and to select a product having an appropriate size. Subsequently, on a monitor display, the product photograph is superimposed on the customer body image.

From the above description of Swab's system, it is clear that, due to the small amount of scanned points, only the customer's general body shape can be displayed, and that the resulting body image cannot be very appealing.

Therefore the goal of the present invention is to alleviate the above mentioned drawbacks of the prior art and to generate three-dimensional digital data highly representative of the body of a subject under consideration, irrespective of his/her age, sex and ethnic background, without the need for heavy digitization.

SUMMARY OF THE INVENTION

This objective of the invention is achieved with a method for identifying virtual body profiles for the needs of the clothing industry comprising the steps of:

a) providing an information processing system, b) introducing into that processing system generic 3D morphological data representative of reference size models of garment brands and respective generic categorizing data as resulting from predetermined categorizing criteria, c) deriving from the generic 3D morphological data generic volumetric, dimensional, and angular data as resulting from predetermined volumetric, dimensional, and angular criteria, and recording said generic volumetric, dimensional, and angular data, d) organizing the generic 3D morphological data in the information processing system according to the brands, the categorizing criteria, and the volumetric, dimensional, and angular criteria, e) storing the generic 3D morphological data, the generic categorizing data, and the generic volumetric, dimensional, and angular data thereby creating a database of virtual body profiles, f) acquiring personal morphological data from a human subject under consideration and respective personal categorizing data as resulting from the categorizing criteria, g) deriving from the personal morphological data personal volumetric, dimensional, and angular data as resulting from the volumetric, dimensional, and angular criteria, and recording the personal volumetric, dimensional, and angular data, h) searching in the database and selecting therefrom a suitable profile matching, within acceptable tolerances, the personal volumetric, dimensional, and angular data and the personal categorizing data.

The generic 3D morphological data may originate from the three-dimensional digitization of the bodies of live fit models regarded by the brands as representative of a given consumer target, and alternatively or simultaneously, may originate from modified pre-existing virtual bodies in accordance with the brands' predetermined body measurement charts.

The generic 3D morphological data may as well originate from international or national measurement campaigns.

According to the invention, the method includes preferably an additional final step of extracting from the database and displaying a virtual dummy body defined by the generic 3D morphological data attached to the suitable profile.

It is pointed out that, in the method according to the invention, the personal morphological data are acquired by scanning only a minimum number of points on the body of the subject so as to derive measurements corresponding to the personal volumetric, dimensional, and angular data.

Alternatively, these personal morphological data may be acquired from an itemized form filled in by the person.

The categorizing criteria used for identifying virtual body profiles comprise at least gender, body type, and size.

Preferably, the gender is defined by a group of values comprising at least: unisex, male adult, female adult, male child, female child.

It is convenient to define the body type by the group of values comprising at least: men, women, missy, petite, junior, boy, girl, toddler.

The categorizing criteria further comprise advantageously age range, ethnicity, brands' location, brands' style.

The method according to the invention is also preferably based on:

volumetric criteria defined by a group of values comprising at least: neck girth, chest girth, waist girth, hip girth;

dimensional criteria defined by a group of values comprising at least: full arm length, body height, waist height, inseam;

angular criteria defined by a group of values comprising at least: center front torso angle, center back torso angle, center front waist torso angle, center back waist torso angle.

The generic 3D morphological data in the information processing system are organized further according to additional categorizing criteria derived from the volumetric, dimensional, and angular criteria.

These additional categorizing criteria comprise body shape defined by a group of values comprising at least: woman hourglass, woman pear shaped, woman cylindrical, man cone shaped, man apple shaped, man cylindrical.

Other additional categorizing criteria comprise posture defined by a group of values comprising: up-right, normal, relax.

The present invention also relates to an apparatus for identifying virtual body profiles for the needs of the clothing industry. This apparatus comprises:

an information processing system comprising a database system;

means for introducing into the information processing system generic 3D morphological data representative of reference size models of brands and respective generic categorizing data as resulting from previously defined categorizing criteria;

means for deriving from the generic 3D morphological data generic volumetric, dimensional, and angular data as resulting from predetermined volumetric, dimensional, and angular criteria, and recording these generic volumetric, dimensional, and angular data, means for organising and storing the generic 3D morphological data in the database system according to the brands, the categorizing criteria, and the volumetric, dimensional, and angular criteria, thus creating virtual body profile records;

means for acquiring in the information processing system the personal morphological data from a human subject under consideration and respective personal categorizing data as resulting from the categorizing criteria;

means for deriving from the personal morphological data personal volumetric, dimensional, and angular data as resulting from the volumetric, dimensional, and angular criteria, and recording the personal volumetric, dimensional, and angular data;

means for searching in the database and selecting therefrom a suitable profile matching., within acceptable tolerances, the personal volumetric, dimensional, and angular data and the personal categorizing data.

Preferably, the categorizing criteria used by the apparatus according to the invention comprise at least gender, body type, and size.

The database comprises a main table indexed by a primary key built by concatenating at least a brand code representative of each of the brands, a gender code representative of each value of the gender, a body type code representative of each value of the body type, a size code representative of each value of the size, and a version number representative of the creation date of the records.

Advantageously, this main table comprises at least a brand field containing the brands' names, a gender field containing the gender values, a body type field containing the body type values, a size field containing the size values, and a version field containing the version number.

The volumetric criteria which are used by the apparatus according to the invention are defined by a group of values comprising at least: neck girth, chest girth, waist girth, hip girth, and the dimensional criteria are defined by a group of values comprising at least: full arm length, body height, waist height, inseam.

The database comprises also a virtual body block measurement table having a key field containing the primary key defined above and comprising at least block measurement fields corresponding to values of the volumetric and dimensional criteria.

The angular criteria which are used by the apparatus according to the invention are defined by a group of values comprising at least: center front torso angle, center back torso angle, center front waist torso angle, center back waist torso angle.

Thus, the database comprises further a virtual body angulation table having an index field containing the primary key and comprising at least body angulation fields corresponding to values of the angular criteria.

The apparatus according to the invention includes visualization means for extracting from the database and displaying a virtual dummy body defined by the generic 3D morphological data attached to the suitable profile matching the consumer's data.

These visualization means include means for generating a video sequence featuring the virtual dummy body, or at least a front view, a back view, and a side view of this virtual body.

BRIEF DESCRIPTION OF THE DRAWINGS

FIG. 2 shows the brands record data structure of the main table of the database implemented in an apparatus according to the preferred embodiment of the invention.

FIG. 3 shows the brands record data structure of the virtual body measurement table of the database according to that preferred embodiment of the invention.

FIG. 4 shows the brands record data structure of the virtual body angular measurement table according to that preferred embodiment of the invention.

DESCRIPTION OF THE PREFERRED EMBODIMENTS

Figure 1:
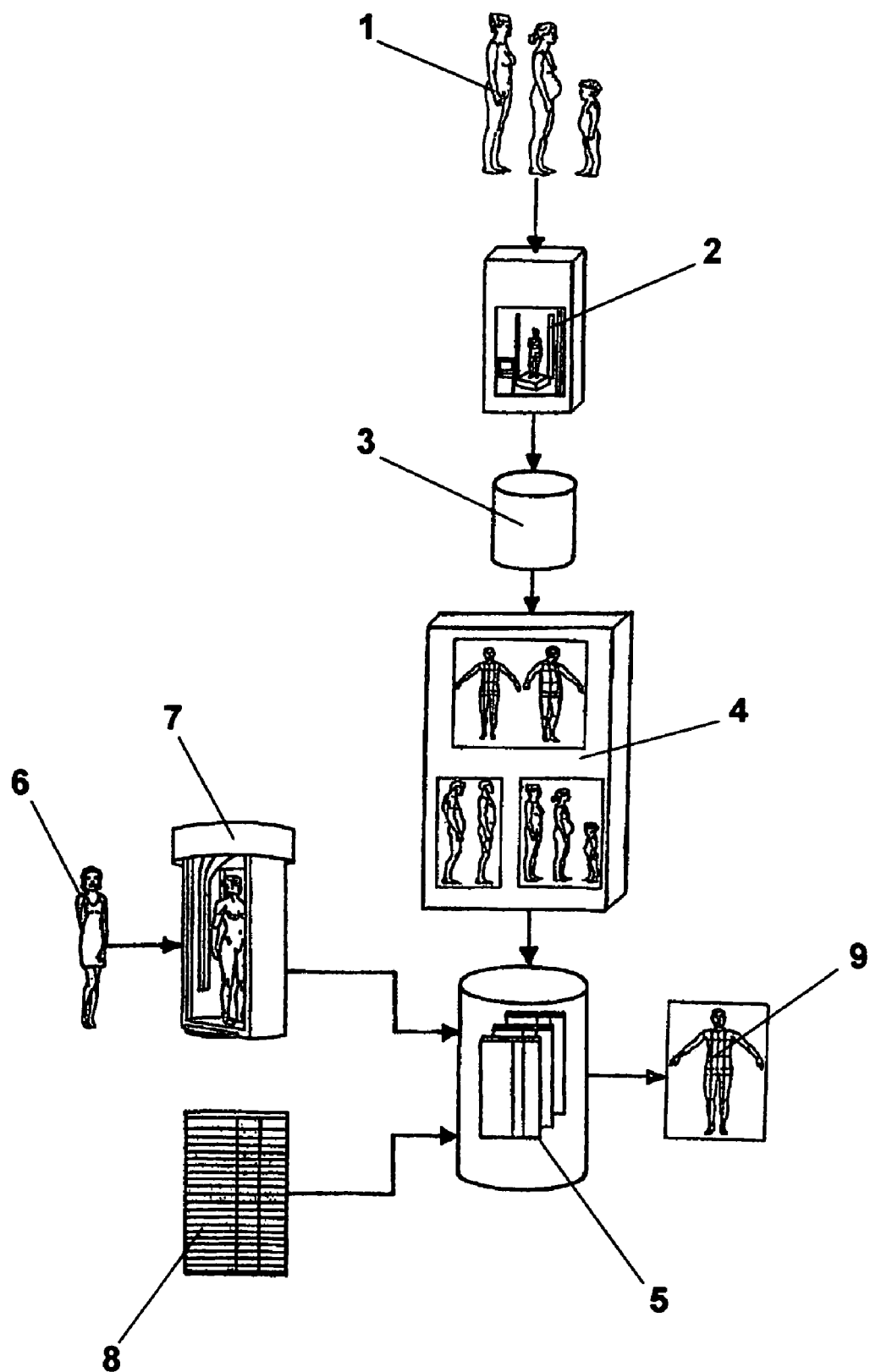
FIG. 1 shows the main steps of the method according to the invention.

In developed countries—North America, European Union, Japan, Australia, etc, the majority of people buy off the rack clothing from garment brands. The diversity of these brands, with their diversity of reference human models body profiles and its extrapolation into the brands' various sizes enable the multitude of brands to construct garments to "fit" their targeted consumers, and thus produce the diversity of garment to "fit" the majority of the population.

Instead of attempting to define the body profile of the consumers per se from the general population, the method according to the invention attempts to categorize the body profiles of the specific brands' reference size human models, and all offered sizes, through the brands' grading rules. Provided that there are enough brands in the database, the majority of consumers will be represented by these brands/size/category.

As is clear from FIG.1, data obtained from live fit models 1 regarded by the brands as representative of a given consumer target are first collected using a three-dimensional scanning booth 2 ("3D scanner") and the morphological data thus collected are stored in the mass memory 3 of an information processing system.

According to an alternative embodiment, the 3D morphological data introduced into the computer system originate from pre-existing virtual bodies which have been modified in accordance with the brands' predetermined measurement charts.

These data to be modified by the brands may be obtained from a morphological population survey and previously collected using the same kind of three-dimensional scanning booth 2 as shown on FIG. 1.

A survey of this kind can be conducted following national or international standards (e.g. ASTM), may be general, systematic or sample-based, but may also be narrowly targeted for the needs of a detailed knowledge of a specific class of individuals such as soldiers, school children, the customers of a particular chain store, of a particular catalogue, etc.

Then, these data are organized 4 into categories or "profiles" according to predefined key criteria such as:
brands' names;
categorizing criteria such as : gender, body type, size, age range, ethnicity;
volumetric criteria such as neck girth, chest girth, waist girth, hip girth;
dimensional criteria such as arm length, body height, waist height, inseam (without shoes);
angular criteria such as center front torso angle, center back torso angle, center front waist torso angle, center back waist torso angle.

Thus a database 5 of profile groups is obtained which can constantly be added to by the importing the data of new surveys or special studies.

In order to obtain three-dimensional digital data representing the body of a subject 6 under consideration, particularly with a view to generating a virtual dummy body, first of all the body of the subject 6 under consideration is scanned in a "light" scanning booth 7 so as to take from the subject only the measurements corresponding to the key criteria mentioned above.

In computer aided clothes design, the subject 6 under consideration is a specific customer 6 wishing to buy from a shop equipped with this "light" scanning booth 7.

The scanning booth 7 is said "light", because the result of the scan is not a huge set of data (many thousands or even millions of points representing the body surface) but only the few key measurements of the customer's body.

Alternatively, if these key measurements are already known by the customer 6, they may be entered by the customer 6 himself/herself by means of a keyboard.

The customer 6 may also file in an itemized form 8, and then the data are entered in the information processing system by an operator.

Once the measurements corresponding to the above-mentioned key criteria have been obtained a search is run in the profile database 5 to see whether there is a profile corresponding to this combination of measurements within acceptable tolerances for each of the key criteria.

Once a suitable profile matching the data of the body of the subject 6 under consideration has been determined, the 3D morphological data associated with this profile are used to produce a virtual dummy body 9 which is highly representative of the body of this subject 6.

Preferably, lines passing through key morphological points on the model bodies 9 are provided on these bodies 9.

In the case of computer aided clothing design, in particular, these lines, commonly known as "red lines" or "block lines", correspond to horizontal and vertical cutting planes and are intended to allow the garment to be constructed on the dummy body.

As it will be understood, in order to obtain three-dimensional digital data representative of the body of a subject 6 under consideration, all that is required is to carry out a search through a pre-existing database 5, starting from a limited number of key criteria.

Thus, "light" scanning of the body of the subject under consideration 6 is sufficient, i.e. scanning in which a relatively small number of points are scanned.

Such light scanning can be carried out using unsophisticated and hence inexpensive apparatus.

It will also be noted that the digital data used in the process according to the invention can easily be transmitted to any compatible system through a data network (of the Internet or Intranet type, for example) which constitutes a crucial aid for any professional working in any field closely connected with the human body.

This is true particularly of designers and manufacturers of articles of clothing who wish to produce specific clothes intended either for a customer base with a very narrowly targeted profile or simultaneously for different population groups with their own characteristics, with the intention of dressing them in the same style while giving them the same level of fit and comfort.

Whatever the objectives of the professionals of the apparel industry might be, the process of constructing a brand's body profile is unique, as it will be explained below.

As there are many different available scanners on the market, the result of a scan must be manipulated to produce a set of data compatible with the specifications of the system according to the invention—called in short UBPIS for "Universal Body Profile Identification System".

By using a 3D body scanner, a dedicated software module can scan the fit model to obtain a 3D digital cyber form that consists of hundreds of thousands high density points.

The raw data are simplified into less dense but orderly point clouds. They are then processed for consistency with the human morphology by adjusting postural planes, attitude angles and bilateral symmetry according to the brand's requirements and operator's experience in sculpting cyber mannequins.

Specific scanning methods are not crucial for the acquisition of the body profile 3D modeling process as long as the quality of the point cloud is accurate enough to define the body shape under scan.

By means of this dedicated software module, the scanned points are interactively simplified by the operator to create a clean virtual body profile close, but not identical, to the scanned body profile.

As human body is asymmetrical, symmetry adjustment must be made. Fit models scanned by normal scanners illustrate this prominently because the human model under scan cannot easily control his position, posture and attitude.

On the other hand, mass market garment manufacturing requires symmetrical bodies to assess fit.

Therefore, symmetry of virtual body is made by the same technique as garment pattern making: simply work on one half of the body for any shape or measurement alteration, the other half is just result of mirror mathematical symmetry calculations.

The attitude angle is identified by placing angles on the several important "Fit Zones" while creating the 3D virtual body. The operator is then able to gauge and compare the different postures of different forms. Since this is part of the process of the virtual body acquisition process, these angles are catalogued into a database where all these measurements can be referenced later.

As it is required the mannequin posture to be correct and relatively in line with the industry averages, "posture" comparisons are performed by comparing these angles in order to determine the posture variations. With this data, it is possible to analyze postures of different segments of the market.

Using UBPIS measurement rules, the brand can take measurements of its fit model and create its own measurement specifications.

Following the same measurement rules, UBPIS 3D model controls all body measurements and readjusts body volume respecting original body shape.

Using the brand's sizing grade rules, all new size mannequins can be created for the brand within UBPIS.

Even if UBPIS proposes measurement rule standardization by suggesting its measurement manual during virtual fit model construction, some brand's departments prefer following their own measurement rules.

Since block measurements are key measurements to categorize body profiles, any different measurement rule always defines these block measurements as the same within certain tolerances:

neck girth
chest girth
waist girth
hip girth

There is an exception to this rule: the arm length measurement either across back elbow point and back wrist point, or across side elbow point and side wrist point.

Using block measurements to categorize and identify body profiles is an accurate method of categorization since, from a brand's department to another, block measurements are the same.

The last step of the process of constructing the brand's profile is the approval by the brand of a measurement chart and of several virtual body screenshots:

an "x-ray" screenshot;
an orthographic screenshot (Front, side, back views);
a perspective screenshot;
an angulations screenshot.

An approved virtual body may be used to create a size set of virtual bodies according to the brand's own grading rules. Each extrapolated size needs fit assessment and visualization, as much as reference body profile. All these bodies created are responding to brand's department requirement.

The 3D morphological data and key measurements corresponding to the virtual bodies approved by the brands are then classified 4 according to the UBPIS classification scheme specified below:

1. The classification starts with the name of the brand.
2. In the USA, most brands cater to more than one size range. These size ranges are organized by retail catering to a certain gender/age group/size range denoted by the department e.g. Liz Claiborne Junior, Missy, Plus are all Liz Claiborne female brands.
3. The visual body generated by UBPIS is a dressform constructed for the brands to assess fit. The key block positions are always placed in the same definable anatomical position of the UBPIS human profiles. All other dimensional positional lines are according to the brand's preferences. These lines are called the "blue lines" denoted by actual markings on the cyber dummy. The block lines are generally merged with the "blue lines" and although they may not be called block positions by the brand, UBPIS can always define these positions common to all brands on the human anatomy. The merging transparency of the "blue lines" onto the block positions can verify this point. This rationalizes and standardizes the block lines, which are key feature lines.
4. Body angles are hard to measure because of the dynamic body movements. The static virtual dummy body enables this angle to be accurately measured. There are four angulations that can be measured.
5. These angulations together with the block positions are used as the key body profile parameter of the brand/department/size.
6. The height/weight ratio of the torso of the reference virtual dummy body—the virtual dummy body is without head or feet. This torso possesses a fixed volume that can be calculated using the relevant functionality of an open high-end 3D computer graphics software package such as MAYA ®. As the size expands, the proportional volume expands, however the height expands much less than girth. This height/weight ratio can be calculated applying MAYA®. This is at present a table kept for information in case of future research. This is not a parameter used in UBPIS search.

7. Once the key block dimensions are defined, the shape is named (for female shapes):

"hourglass": chest large, waist smaller, hips large

"pear shaped": hips large, chest and waist smaller

"apple shaped": large chest, medium waist, smaller hips

"cylindrical": hips, waist, chest roughly the same or (for male shapes):

"drop": the ratio of the chest girth against the waist girth.

At the end of the classification process 4, the 3D morphological data and key measurements corresponding to the virtual bodies approved by the brands are added to the UBPIS database 5, the structure of which is detailed below with reference to FIGS. 2 to 3.

The UPBIS database 5 is a unique database with a collection of virtual body (VB in short) profile records 10,11,12 for each garment brand stored in several tables 13,14,15. The VB is the body profile of a specific brand's reference size human model and all offered sizes through the brands' grading rules extrapolated from the reference size.

Each tables 13,14,15 will be indexed by a master "Virtual Body Identification" (VBID) or UBPIS KEY 16. This is a unique composite identification number among all different brands. In the UBPIS database 5, the UBPIS KEY 16 of the virtual body for a brand will be represented by:

UBPIS KEY=[Brand]–[Gender][Body Type][Size]–[version](optional).

For instance, the UBPIS KEY 16 for a VB record 10,11,12 of a brand:

Brand="Brand A" (Brand Code="BDA");

Gender="Female-adult" (Category Code="FA");

Body Type="Missy" (Body Code="MS");

Size="8" (Size Code="008");

Version="August2005" (Version Number="0508"); will be defined as:

BDA—FAMS—008-0508

In order to categorize a specific body the following information is attributed:

Gender [unisex, male adult, female adult, male child, female child]

Body Type [Missy, petite, junior, toddler . . . ]

Size [Boy "8", Missy "10", Petite "6" . . . ]

So, for a garment brand with all categories and all sizes, the record set of this brand in the main table 13 of the UBPIS database is shown on FIG. 2.

The primary key 16 of the main table 13 contains the UBPIS KEY defined above, and the others fields 17,18,19, 20,21 contains the brand code 17 representative of each of the brands, the gender code 18 or category representative of each value of the gender, the body type code 19 representative of each value of the body type, the size code 20 representative of each value of the size, and the version number 21 representative of creation date of each record 10.

A virtual body block measurement table 14 is used to store the block measurements or key measurements for body profile identification. These are the minimum measurements necessary to define a body profile.

According to the brand's department sizing definition whether one defines top or bottom garments, UBPIS search engine can be reduced to torso or lower body measurements.

The virtual body measurement table 14 in UBPIS database 5 which stores the records 11 of the brands is shown on FIG. 3.

The primary key 16 of this table 14 contains the UBPIS KEY defined above, and the others fields 22,23,24,25,26, 27,28,29 contain the set of specific block measurements corresponding to each value of the UBPIS KEY 16, namely a neck girth field 22 a chest girth field 23 a waist girth field 24 a waist height field 25 a hip girth field 26 inseam height field 27 a body height field 28 a full arm length field 29

A virtual body angulation table 15 is used to store the angulation for body profile identification. These are also the minimum measurements necessary to define a body profile.

The virtual body angulation table 15 which stores the records 12 of the brands in UBPIS database 5 is shown on FIG. 4.

The primary key 16 of this table 15 contains the UBPIS KEY defined above, and the others fields 30,31,32,33 contain the set of other specific block measurements corresponding to each value of the UBPIS KEY 16, namely a center front torso angle [at center front-neck] field 30 a center back torso angle [at center back-neck] field 31 a center front waist torso angle field 32 a center back waist torso angle field 33.

The searching function of the UBPIS database assumes some commonsense knowledge from consumers and is based on the following design criteria:

1. Although general consumers have limited knowledge on their own body profile, UBPIS system assumes that most people do have knowledge of key body measurements. These key measurements are assumed to be represented by the above defined block measurements. All garments will include a label showing these key block measurements for that category of garment.

2. UBPIS also assumes that consumers can identify at least one brand of top, bottom, jacket, dress etc. of common garment category they perceive as "fitting" their body profile.

3. Consumers may match a brand's top body torso but mismatch the same brand's bottom body torso. This is perfectly normal. This only means that consumers fit in the top garments and not the bottom garments of that brand.

4. Even within one country, for the same size, brands may differ in their block measurements and virtual body angulations, but consumers do not understand these differences between the brands. In order to solve that problem, the UBPIS system easily recognizes the variances and calculates whether these differences are within tolerances for fit.

5. Garment manufacturing allows tolerances for key dimensions.

Any variances within garment manufacturing tolerance are accepted as still fitting.

With the above assumptions, a customer can locate his/her own matching body profile within a brand under the UBPIS classification system from a video computer screen interface.

The purpose of the search is to match the consumer's body profile to an UBPIS-KEY assigned to that brand/size.

This obviously assumes there is such a match in the database. For the match to even begin to be possible, the brand represented must have been registered in the UBPIS system.

To locate his/her UBPIS-KEY in a brand, then the customer only requires:

his/her key block body measurements;
the brand/department/size he/she perceives as fitting.

If the customer does not understand key block body measurements scheme, a pictorial diagram of the front and side view of the cyber body profile representing that gender/department/reference size body profile is provided as a guide. The positions of the block body measurements are clearly illustrated. The customer can use this guide to fill in 8 his/her block body dimensions in an itemized form.

If the customer does not know what brands suits him/her, a list of brands/departments is similarly displayed to guide the selection. Obviously the brands provided are ones that have been previously registered in UBPIS.

The UBPIS search engine, using specific matching rules, will then identify his/her UBPIS-KEY and select the matching brands for the category of garments under consideration if the brands are available.

Since key information defining a body profile is linked to each UBPIS-KEY, meaning each virtual body, a simple yet powerful search engine can be defined. The consumer needs only search with the above two criterion; however, the internal computer search to find a virtual body in UBPIS database 5 can be done by searching following criteria:

1-Search by body type and size within a department ["Missy 8", "Petite 6", "Boy 8" . . . ]
2-Search by key block measurements:
a-neck girth
b-shoulder width
c-shoulder width
d-chest girth
e-waist girth
f-hip girth
g-inseam
3-Search by location [e.g. USA, CHINA, FRANCE . . . ]
4-Search by shapes
5-Search by age range
6-Search by brand's name
7-Search by brand's style
8-Search by posture (through the body angulations)

It should be noted that since there are substantial specific data defining the UBPIS virtual body, new functional applications of this body profile data (such as body volumes and height/weight ratios) will define the new search criterion to locate the body easily. This search engine is upwardly expandable.

At a retail shop-physical or on the web-the UBPIS system will inform the customer whether the brand has a match to the consumer.

The result of the search can be shown visually as a virtual 3D body torso, or a 3D avatar, with a selection of ethnicities and facial features together with dimensional and angular features. It will define its shape and give the key block dimensions and body angles.

Advantages

The UBPIS system is readily a platform to standardize size/fit which provides several advantages both to brands and customers:

not all brands have defined their target consumer's body profiles scientifically. The UBPIS system will assist them to construct body profiles to suit their needs.

consumers can visualize and understand the body dimensions and shapes of participating brands.

the UBPIS system will provide the basis for consumers matching their body profile to the body profile of the brands. The Brand's sizes and its body profile can be visualized and will become more understandable.

While the invention has been illustrated and described in the drawings and foregoing description, it is to be understood by those skilled in the art that the invention is not limited thereto. Rather the scope of the invention is to be interpreted only in conjunction with appended claims.

I claim:

1. A method for identifying virtual body profiles for the needs of the clothing industry, said method comprising the steps of:

a) providing an information processing system,
b) introducing into said processing system generic 3D morphological data representative of reference size models of garment brands and respective generic categorizing data as resulting from predetermined categorizing criteria,
c) deriving from said generic 3D morphological data generic volumetric, dimensional, and angular data as resulting from predetermined volumetric, dimensional, and angular criteria, and recording said generic volumetric, dimensional, and angular data,
d) organizing said generic 3D morphological data in said information processing system according to said brands, said categorizing criteria and said volumetric, dimensional, and angular criteria,
e) storing said generic 3D morphological data, said generic categorizing data, and said generic volumetric, dimensional, and angular data thereby creating a database of virtual body profiles,
f) acquiring personal morphological data from a human subject under consideration and respective personal categorizing data as resulting from said categorizing criteria,
g) deriving from said personal morphological data personal volumetric, dimensional, and angular data as resulting from said volumetric, dimensional, and angular criteria, and recording said personal volumetric, dimensional, and angular data,
h) searching in said database and selecting therefrom a suitable profile matching, within acceptable tolerances, said personal volumetric, dimensional, and angular data and said personal categorizing data.

2. The method according to claim 1, wherein said generic 3D morphological data originate from the three-dimensional digitization of the bodies of live fit models regarded by said brands as representative of a given consumer target.

3. The method according to claim 1, wherein said generic 3D morphological data originate from modified pre-existing virtual bodies in accordance with said brands' predetermined body measurement charts.

4. The method according to claim 1, wherein said generic 3D morphological data originate from international or national measurement campaigns.

5. The method according to claim 1, including an additional final step of extracting from said database and displaying a virtual dummy body defined by said generic 3D morphological data attached to said suitable profile.

6. The method according to claim 1, wherein said personal morphological data are acquired by scanning only a minimum number of points on the body of said subject so as to derive measurements corresponding to said personal volumetric, dimensional, and angular data.

7. The method according to claim 1, wherein said personal morphological data are acquired from an itemized form filled in by said subject.

8. The method according to claim 1, wherein said categorizing criteria comprise at least gender, body type, and size.

9. The method according to claim 8, wherein said gender is defined by a group of values comprising at least: unisex, male adult, female adult, male child, female child.

10. The method according to claim 8, wherein said body type is defined by the group of values comprising at least: men, women, missy, petite, junior, boy, girl, toddler.

11. The method according to claim 8, wherein said categorizing criteria further comprise age range, ethnicity, said brands' location, said brands' style.

12. The method according to claim 8, wherein said generic 3D morphological data in said information processing system are organized further according to additional categorizing criteria derived from said volumetric, dimensional, and angular criteria.

13. The method according to claim 12, wherein said additional categorizing criteria comprise body shape defined by a group of values comprising at least: woman hourglass, woman pear shaped, woman cylindrical, man cone shaped, man apple shaped, man cylindrical.

14. The method according to claim 12, wherein said additional categorizing criteria comprise posture defined by a group of values comprising: up-right, normal, relax.

15. The method according to claim 1, wherein said volumetric criteria are defined by a group of values comprising at least: neck girth, chest girth, waist girth, hip girth.

16. The method according to claim 1, wherein said dimensional criteria are defined by a group of values comprising at least: full arm length, body height, waist height, inseam.

17. The method according to claim 1, wherein said angular criteria are defined by a group of values comprising at last: center front torso angle, center back torso angle, center front waist torso angle, center back waist torso angle.

18. Apparatus for identifying virtual body profiles for the needs of the clothing industry, said apparatus comprising:
   an information processing system comprising a database system,
   means for introducing into said information processing system generic 3D morphological data representative of reference size models of brands and respective generic categorizing data as resulting from predetermined categorizing criteria,
   means for deriving from said generic 3D morphological data generic volumetric, dimensional, and angular data as resulting from predetermined volumetric, dimensional, and angular criteria, and recording said generic volumetric, dimensional, and angular data,
   means for organizing and storing said generic 3D morphological data in said database system according to said brands, said categorizing criteria, and said volumetric, dimensional, and angular criteria, thus creating virtual body profile records,
   means for acquiring in said information processing system personal morphological data from a human subject under consideration and respective personal categorizing data as resulting from said categorizing criteria,
   means for deriving from said personal morphological data personal volumetric, dimensional, and angular data as resulting from said volumetric, dimensional, and angular criteria, and recording said personal volumetric, dimensional, and angular data,
   means for searching in said database and selecting therefrom a suitable profile matching, within acceptable tolerances, said personal volumetric, dimensional, and angular data and said personal categorizing data.

19. The apparatus according to claim 18, wherein said categorizing criteria comprise at least gender, body type, and size.

20. The apparatus according to claim 19, wherein said database comprises a main table indexed by a primary key built by concatenating at least a brand code representative of each of said brands, a gender code representative of each value of said gender, a body type code representative of each value of said body type, a size code representative of each value of said size, and a version number representative of the creation date of said records.

21. The apparatus according to claim 20, wherein said main table comprises at least a brand field containing said brands' names, a gender field containing said gender values, a body type field containing said body type values, a size field containing said size values, and a version field containing said version number.

22. The apparatus of claim 20, wherein said volumetric criteria are defined by a group of values comprising at least: neck girth, chest girth, waist girth, hip girth, and wherein said dimensional criteria are defined by a group of values comprising at least: full arm length, body height, waist height, inseam.

23. The apparatus according to claim 22, wherein said database comprises a virtual body block measurement table having a key field containing said primary key and comprising at least block measurement fields corresponding to values of said volumetric criteria and said dimensional criteria.

24. The apparatus according to claim 20, wherein said angular criteria are defined by a group of values comprising at least: center front torso angle, center back torso angle, center front waist torso angle, center back waist torso angle.

25. The apparatus according to claim 24, wherein said database comprises a virtual body angulation table having an index field containing said primary key and comprising at least body angulation fields corresponding to values of said angular criteria.

26. The apparatus according to claim 18, including visualization means for extracting from said database and displaying a virtual dummy body defined by said generic 3D morphological data attached to said suitable profile.

27. The apparatus of claim 26, wherein said visualization means include means for generating a video sequence featuring said virtual dummy body, or at least a front view, a back view and a side view of said virtual body.

* * * * *